Figure 1:
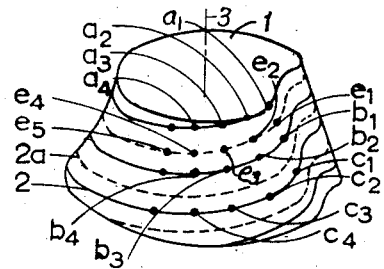

July 7, 1959 R. A. CAIL ET AL 2,894,186
AUTOMATIC TOOLS AND OTHER APPARATUS FOR SHAPING WORKPIECES
Filed Aug. 22, 1955 3 Sheets-Sheet 1

Inventors
R. A. Cail
G. E. E. Warder
By Glascock Downing Diebold
Attys

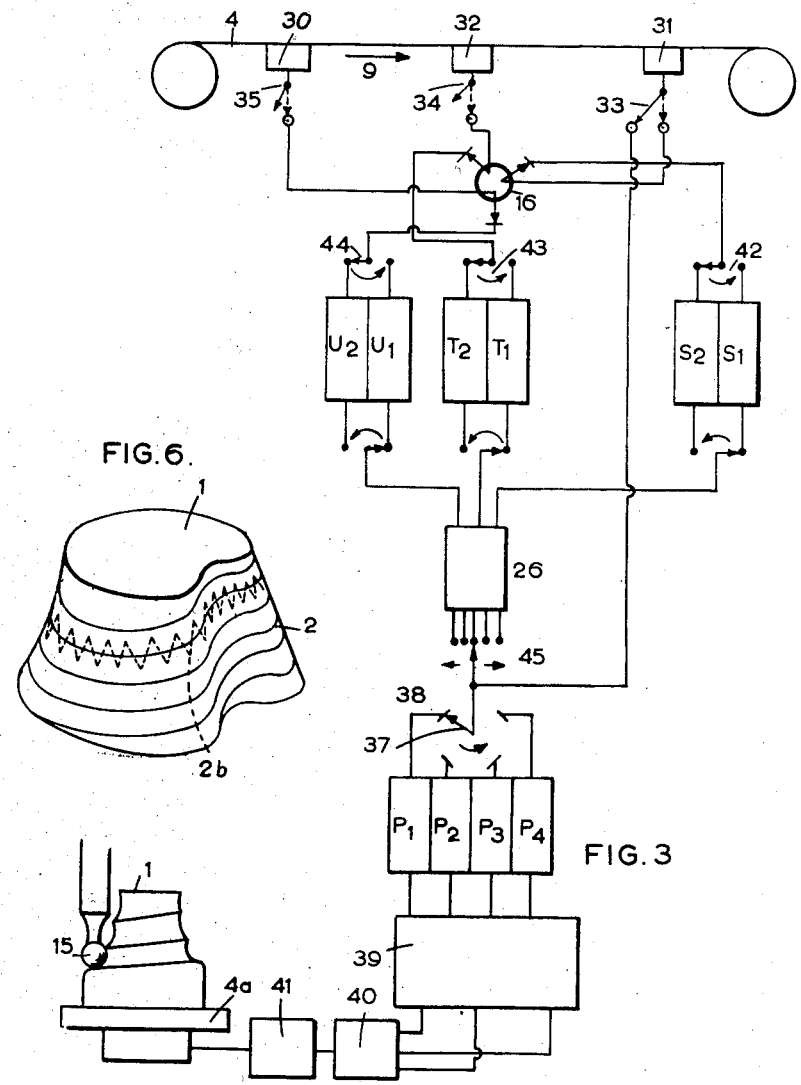

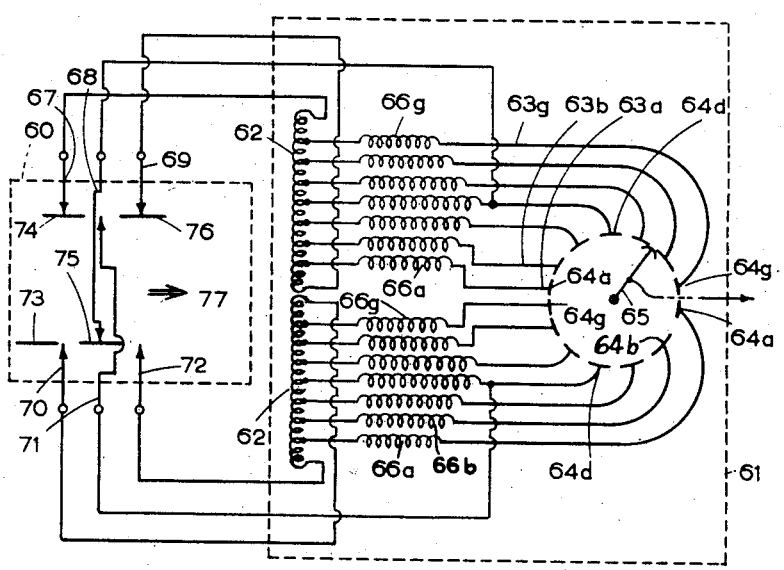
FIG. 5.
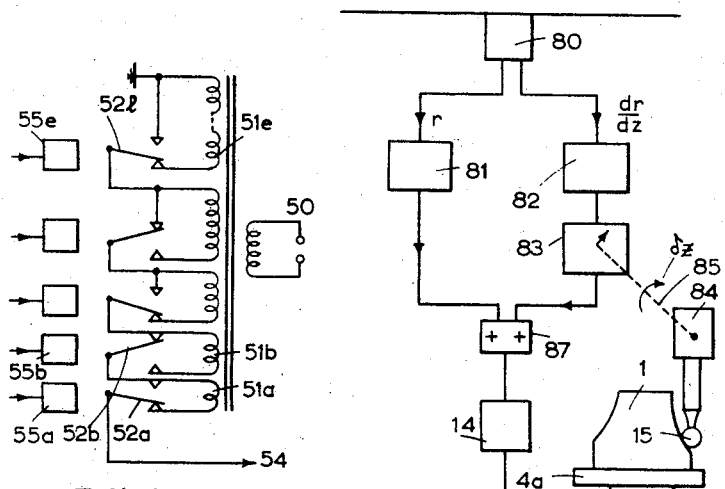
FIG. 4.
FIG. 7

United States Patent Office 2,894,186
Patented July 7, 1959

2,894,186

AUTOMATIC TOOLS AND OTHER APPARATUS FOR SHAPING WORKPIECES

Roland Allan Cail, Slough, and George Ernest Evans Warder, Stamford Brook, London, England, assignors to Electric & Musical Industries Limited, Hayes, Middlesex, England, a company of Great Britain Application August 22, 1955, Serial No. 529,771

Claims priority, application Great Britain August 25, 1954

10 Claims. (Cl. 318—39)

This invention relates to automatic machines for milling, cutting or otherwise shaping workpieces.

Various proposals have been made heretofore for the construction of machine tools which will automatically shape a workpiece to a predetermined shape in response to instructions derived from a perforated tape or similar instruction record. One such proposal, in the form of an automatic cam profiling mill, is described in pending United States patent application Serial No. 518,912. According to the proposal, the workpiece is located on a worktable which is rotated and simultaneously displaced longitudinally with reference to the axis of a milling cutter in response to instructions relating to the radius of the cam at discrete angular ordinates thereof. The instructions are recorded on a film record in binary digital code form and are converted to a voltage analogue form, and the instructions are taken into service in groups of three and are applied to a parabolic interpolating device in the form described in pending United States patent application Serial No. 459,814. The output of the interpolating device in turn is responsible for controlling the displacements of the worktable and the cutter in effect is caused to follow a smooth interpolated curve between the discrete ordinates for which the instructions are recorded.

This prior proposal deals only with the milling of two dimensional cams and it may in some cases be desired to mill three dimensional cams. One approach to the problem of milling three dimensional cams is to calculate dimensions for a number of discrete points (hereinafter termed "reference points") on a helical or other locus to be traced by the cutter relative to the workpiece. This has however the disadvantage that ridges will be left between the convolutions of the locus (assumed helical) requiring removal by hand finishing, unless the convolutions are very close together. However, if the convolutions are close together the amount of calculation required tends to become excessive.

The object of the present invention is to provide improved machines for automatically shaping workpieces to three dimensional patterns, with a view to reducing the disadvantage indicated.

According to the present invention there is provided control mechanism, suitable for controlling an automatic machine in response to a record of discrete signals representing values of one co-ordinate of successive relatively widely spaced points on a desired locus in which there are a plurality of spaced substantially co-extensive lengths, comprising means for deriving discrete signals in succession from said record, interpolating means responsive to said signals for generating interpolated signals representing values of said co-ordinate of closer points on said locus, and further interpolating means responsive to said discrete signals for deriving further interpolated signals representing values of said co-ordinate of points on another locus in which there are a plurality of adjacent lengths which interlaced with said lengths of the first locus.

By virtue of the invention cutting can be controlled automatically not only along the locus defined by the reference points but also along a secondary locus in the spaces between adjacent runs of the locus so that even if the locus is relatively coarse, the workpiece can be smoothed automatically to a desired degree of accuracy without hand finishing.

For example, in the case of a helical locus and assuming cylindrical co-ordinates $r$, $\theta$ and $z$, smoothing can be effected by interpolating $r$ in the $z$ direction by utilising co-ordinates of reference points which are angularly spaced by 360° on the helix. The smoothing can be effected by making one or more secondary cuts along a secondary locus similar to the primary locus, the secondary locus having the same pitch as the primary locus defined by the reference points, but displaced axially therefrom by a fraction of the pitch, so that in effect the primary and secondary loci interlace. The primary and secondary cuts may be made by the same or different cutters, in which latter case the secondary cut or cuts can be made at the same time as the primary cut. Alternatively the cutter may be reciprocated systematically in a direction transverse to the primary locus along a path which passes not only through the interpolated points on the primary locus but also those on the secondary locus, the depth of cut being controlled during the movement of the cutter by two dimensional interpolation.

Figure 2:
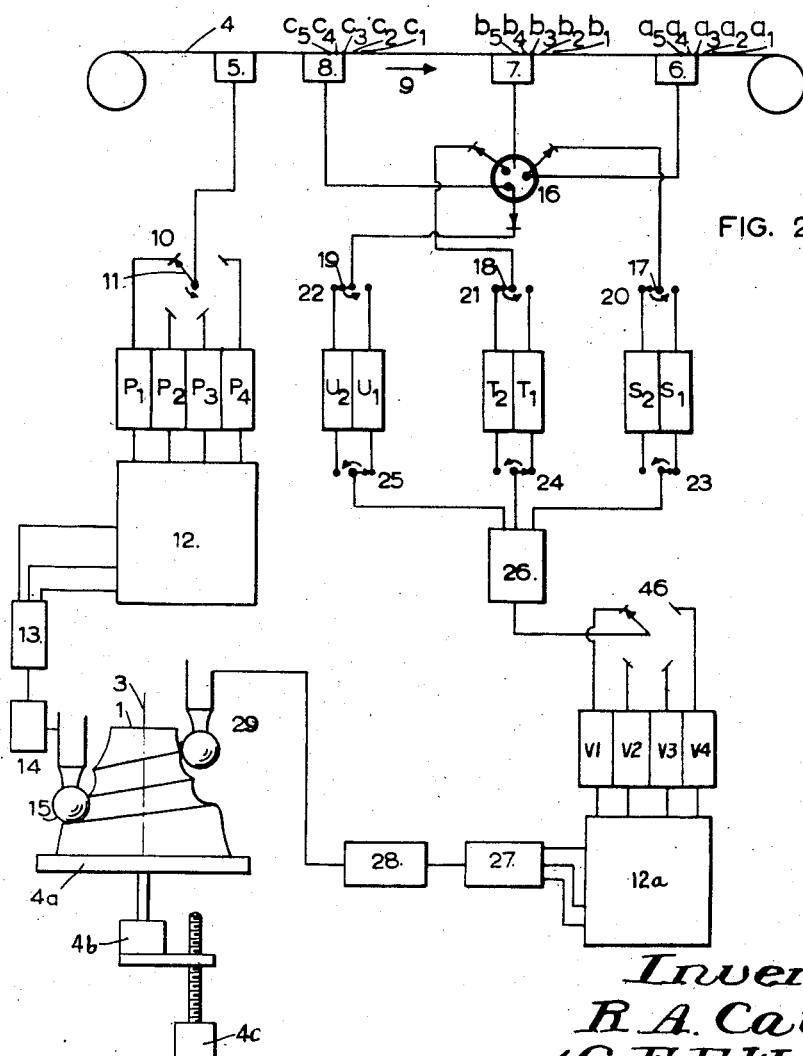

In order that the invention may be clearly understood and readily carried into effect, the invention will be described with reference to the accompanying drawings, in which:

Figure 1 is a diagram explanatory of the invention,

Figure 2 illustrates diagrammatically and mainly in block form one example of a cam profiling mill in accordance with the present invention, Figure 3 illustrates diagrammatically and in block form another example of a cam profiling mill in accordance with the present invention, Figure 4 illustrates one form of storage unit which can be used in machines illustrated in Figures 2 and 3, Figure 5 illustrates one form of interpolating means which can be used in a machine illustrated in Figures 2 and 3, Figure 6 is a further explanatory diagram, and Figure 7 illustrates a further example of a cam profiling mill in accordance with the present invention, adapted to operate in accordance with the principle illustrated in Figure 6.

Referring to the drawing, Figure 1 illustrates in perspective view a representative three dimensional cam which, it will be assumed, is to be produced by a cam profiling mill in accordance with the present invention. Dimensional instructions for the machine are calculated for a series of reference points on a helical locus 2 of pitch $p$, the reference points being defined by the radius $r$ of the cam at successive angles $\theta$ measured about the axis 3 of the cam and successive displacement $z$ measured along the axis. Reference points are denoted by $a1$, $a2$, $a3 \ldots an$, $b1$, $b2$, $b3 \ldots bn$ and $c1$, $c2$, $c3 \ldots cn$ respectively. The reference points $a1$, $a2$, $a3 \ldots$ are disposed on one convolution, the reference points $b1$, $b2$, $b3 \ldots$ on the next convolution and so on and the angular spacing between successive points is such that $a1$ is axially aligned with $b1$, $c1$ and so on.

The machine which is illustrated in Figure 2 is shown mainly in block form since details of the construction of the circuit units represented by the blocks form by themselves no part of the present invention and are not required for an understanding of the present invention. The circuit units represented by blocks may be of a variety of constructions known to those skilled in the art, but in so far as particular constructions covered by co-pending applications known to the applicants are preferred, such constructions are illustrated by and herein described with reference to Figures 4 and 5. Reference 4 represents a film on which the instructions for the reference points are recorded, the instructions being recorded by perforating the film in known manner in accordance with a binary digital code. The location of some instructions are indicated in Figure 2 by the reference $a1$ to $a5$, $b1$ to $b5$ and $c1$ to $c5$. In the present example the instructions are in the form of displacement to be imparted to a milling cutter towards or away from the axis 3 of the workpiece. The machine has a worktable $4a$ in which the workpiece can be clamped and during operation the worktable $4a$ is rotated and moved axially by motors $4b$ and $4c$ to cause the point of contact of the milling cutter to describe the locus 2. Moreover, during operation the film 4 is moved in the direction of the arrow 9, at a rate corresponding to angular displacement imparted to the workpiece, suitable interlock means provided to synchronise the table movements in the $\theta$ and $z$ co-ordinates with the film movement and the rate of operation of the interpolators which are referred to subsequently. The film 4 has four instruction readers 5, 6, 7 and 8 and the separation of the readers 5 and 8 correspond to an angular displacement of the workpiece of 180°, whilst the spacing between the readers 6 and 7 and similarly between the readers 7 and 8 corresponds to a rotation of 360°. The instruction readers 5 to 8 may be similar in construction to teletype tape readers, which are well known and available commercially, so the readers 5 to 8 have been shown merely in block form. Successive instructions picked-off by the reader 5 are applied selectively by a switch 10 to four storage units P1, P2, P3 and P4. The switch 10 has a selector 11 whose rotation is so related to the motion of the film that if it feeds a first instruction to P1, the next is fed to P2 and so on, the fifth being again fed to P1. It is also arranged that when an instruction is applied to a storage unit, any previous instruction stored therein is automatically displaced, the instructions being stored as voltages which are analogues of the corresponding dimension. If the construction of such storage units is as described in Figure 4 the voltages are alternating voltages. The instructions stored in the units are then applied three at a time by means of a switch 12 to an interpolating device 13 which effects quadratic interpolation. A suitable construction for the switch 12 and the device 13 is illustrated in Figure 5. Switch 12 is timed in relation to switch 10 so that as the latest instruction picked-off by the reader 5 is being applied to one of the storage units say P1, the instructions stored in the other three units are applied to the device 13 which produces instructions for successive closely spaced points on a parabola drawn through the three reference points to which the respective instructions relate. The output of the interpolating device 13 is applied to a servo mechanism represented by the block 14 which in turn controls a milling cutter 15 (hereinafter termed the primary cutter) so as to vary the distance between the axis of the cutter and that of the workpiece 1. The servo mechanism 14 may be of any suitable construction.

The instructions picked-off by the reader 6, 7 and 8 are applied respectively via a switch 16 to the selectors 17, 18 and 19 of three two-way switches 20, 21 and 22. The switches 20, 21 and 22 are connected to storage units S1, S2 and T1, T2 and U1, U2 respectively, each like the storage units P1, P2 etc. The selectors are operated at a rate determined by the rate of rotation of the table $4a$, so that successive instructions reaching one of these selectors from the respective reader are applied alternately to the two storage units associated with the respective switches. In the drawing it is assumed that the instructions for the reference points $a4$, $b4$ and $c4$ are stored in the units S1, U1 and T1 respectively while the instruction for reference points $a5$, $b5$ and $c5$ are being applied to storage units S2, T2 and U2. The alternating voltage analogues set up by the storage units are applied via switches 23, 24, 25 like the switches 20, 21 and 22, to a parabolic interpolating device 26, similar to 13. As shown the switches 23, 24 and 25 and the switches 20, 21 and 22 select alternate storage units so that in the drawing the device 26 is receiving instructions from the stores S1, T1 and U1, i.e. instructions for the points $a4$, $b4$ and $c4$. Device 26 has however a fixed output connection and it is arranged to interpolate quadratically to produce an instruction for a point midway between say the reference points to which the instruction from the selector switches 23 and 24 relate. Thus at the time represented in the drawing the device 26 is interpolating the value of $r$ for the point $e4$ in Figure 1, that is it is interpolating for a fixed point on the parabola drawn through $a4$, $b4$ and $c4$. It will therefore be appreciated that during operation of the machine, device 26 evaluates instructions for successive points on a secondary helical locus, denoted by reference $2a$ in Figure 1, which has the same pitch as the locus 2 but is displaced axially by half the pitch $p$. The interpolated points on the secondary locus $2a$ have the same angular spacing as the reference points and some are denoted by $e1$, $e2$, $e3$ and $e4$. The interpolated instructions are applied by means of selector switch 46 in cyclic order to a further group of storage units V1, V2, V3 and V4, and the stored instructions are applied three at a time by a switch $12a$ to a further quadratic interpolating device 27. In the drawing it is assumed that instructions for the interpolated points $e1$, $e2$ and $e3$ are stored in the units V2, V3 and V4 whilst V1 is receiving the instruction for $e4$. Thus, at the time represented in the drawing, device 27 is producing instructions for successive closely spaced points on a parabola drawn through $e1$, $e2$ and $e3$. The output of the device 27 is applied to a servo-mechanism 28 which is arranged to control a second milling cutter 29 (termed the secondary cutter). The axes of the cutters 15 and 29 are angularly spaced by 180° about the axis 3 and the cutter 29, by following the secondary locus $2a$, smooths the ridges which would otherwise be left by the primary cutter between successive convolutions of the locus 1, as indicated in the drawing. The cutting is thus effected under the control of interpolation in two co-ordinate directions from the signals relating to relatively widely spaced reference points.

The example of the invention above described can produce three dimensional cams in which the ridges between the interlaced loci traced by the cutters are of the second order of smallness. In many cases this will give a satisfactorily high degree of accuracy but the ridges may be reduced still further by adding one or more further secondary cutters having their axes angularly disposed at convenient positions round the axis 3. For example, one primary and two secondary cutters may be provided angularly spaced at intervals of 120°. If two or more secondary cutters are employed they may be controlled by common equipment as far as the device 26 (which may be termed the axial interpolating device) the device 26 being arranged to interpolate for points on the requisite number of secondary loci and to feed its output in cyclic order to groups of stores like V1 to V4 for the difference secondary cutters.

In the form of the invention shown in Figure 3, only the primary cutter 15 is employed and provision is made for causing the same cutter to make successive interlaced passes over the workpiece. Only three readers 30, 31 and 32 are provided for the film 4, being spaced by distances corresponding to 360°. The apparatus has a series of ganged change-over switches 33 to 35 and in one condition of the switches, (that shown in full lines in the drawing) the readers 31 and 32 are disconnected and the reader 30 is connected to the selector brush 37 of switch 38 which is arranged to apply instructions in cyclic order to a group of storage units P1, P2, P3, P4. In the condition of the apparatus indicated these storage units correspond to the storage units in Figure 2 having the same references. A switch 39, like switch 12 in Figure 2, selects the voltage analogues from the stores P1 to P3 in groups of three and applies them to a quadratic interpolating device 40, whose output controls servo-mechanism 41 which in this case is arranged to displace the worktable so as to alter the distance between the axis 3 of the workpiece 4a and the axis of the cutter (which is fixed) in dependence upon the interpolated instructions received from the device 40. With the change-over switches in the condition shown in full lines the operation of the apparatus is therefore similar to that of the channel for controlling the primary cutter 15 in Figure 2.

When the change-over switches are changed to the condition shown in dotted lines, the direct connection from the reader 30 to the brush 37 of switch 38 is broken, and the readers are connected to the selectors of switches 42, 43, and 44 respectively. These switches are similar to switches 20, 21 and 22 of Figure 2, and they apply alternate instructions from the readers to the storage units S1, S2, T1, T2, U1 and U2 respectively. These storage units are coupled to an axial interpolating device 26 exactly as in Figure 2. This device has a plurality of output points representing different interpolated points and a switch 45 is provided so that a desired one of these points can be selected manually or automatically as desired, to determine the axial separation between the primary locus 2 and the secondary locus 2a. The components P1, P2, P3, P4, 39 and 40 then function to effect quadratic interpolation of the radius of the cam along the secondary locus. Therefore when the change-over switches are in the condition indicated by the dotted lines, the operation of the apparatus is similar to that of the channel for the secondary cutter 29 in Figure 2. The effect achieved in Figure 2 by employing a multiplicity of cutters can therefore be achieved in Figure 3 by using a single cutter and making several passes over the workpiece. It will of course be appreciated that before starting each secondary pass the cutter 15 and the tape 4 have to be brought to appropriate starting positions. Moreover, as many secondary passes as desired can be made, without multiplication of equipment, provided that switch 45 has a corresponding number of positions. It is of course possible to arrange for the change-over between successive passes to occur automatically. In this case it is also possible to dispense with the change-over switches 33 to 35 and the connection from the reader 31 to the selector 37 and use the axial interpolating device 26 for each pass. The instruction for the reference points on the primary locus 2 would then not be used directly to control the cutter 15, since the locus traced during each pass would be defined by points produced by axial interpolation among the reference points. For this application of the invention, the primary locus 2 is extended axially (at each end) beyond the piece to be cut by a sufficient amount to allow the cutting to start and finish at the desired points, instructions relating to points on the extensions of the locus being thus recorded on the film 4 for information only.

In some cases it may be adequate to employ only linear interpolation in the axial direction. This would reduce the accuracy obtainable but would also reduce the required number of readers and storage units.

The form of storage unit shown in Figure 4 can be used for the storage units P1 to P4, shown on Figure 2 and S1, S2, T1, T2, U1 and U2 shown in Figures 2 and 3, although it will be appreciated that other forms of storage unit may be employed if desired. The storage unit shown in Figure 4 is of the construction illustrated in United States patent application Serial No. 459,794 and comprises a primary winding 50 which is energised from a suitable source of alternating voltage of fixed amplitude, the same source being used for all the storage units in the machine. The primary winding 50 is tightly coupled to a series of secondary windings 51a, 51b . . . each having twice as many turns as the preceding winding of the series, so as to represent successive binary digital place. The series of secondary windings 51a, 51b . . . is controlled by a series of switches 52a, 52b . . . so arranged that in one condition of each switch the respective secondary winding is inserted in series between a conductive path from ground to an output terminal 54 and in the other condition of each switch the respective secondary winding is open-circuited. It will therefore be appreciated that if the switches are set in a pattern of states corresponding to a number expressed in a binary digital code, an alternating voltage is set up at the terminal 54 whose amplitude is an analogue of said number. The conditions of the switches are controlled by a series of electro-magnetic relays represented by the blocks 55a, 55b . . . these relays being coupled to the tape reader from which the respective store receives signals. As stated above dimensions are recorded on the tape 4 in binary digital code form and the tape reader which is associated with the storage unit shown in Figure 4 energises the relays 55a, 55b . . . in accordance with a binary member read from the tape. It will therefore be appreciated that the connection between tape readers and storage units which are represented by single lines in Figures 2 and 3 comprises in practice a series of parallel conductors. Similarly, switches such as the switches 10, 17, 18 and 19 in Figure 2 are arranged in practice to be stud switches having a plurality of stud banks corresponding to each binary digit used in recording the dimensions. The storage unit illustrated in Figure 4 is shown as having five relays 55a to 55e indicating that a five digit binary code is used but it will be understood that this is merely for purposes of illustration and in practice the number may be much larger.

Other storage units shown in Figures 2 and 3 may comprise magnetic record stores, the construction of which is well known.

In Figure 5 the parts enclosed by the dotted outline 60 will be assumed to represent one of the switches, say the switch 12 used for feeding a quadratic interpolating device. Moreover the parts enclosed within the dotted outline 61 illustrate a suitable construction of the corresponding quadratic interpolating device, say the device 13. The switch 60 and the device 61 are substantially of the construction illustrated in United States patent application Serial No. 459,814. The device 61 in fact comprises duplicate interpolators which are of the same construction. Each of the interpolators comprises an autotransformer 62 to which a series of conductors 63a, 63b . . . are tapped at equi-spaced points on the autotransformer. The conductors lead to a series of contact studs 64a, 64b . . . which as shown are arranged in a semi-circle and form with the corresponding studs of the other interpolator a stud circle which is scanned by a brush 65 at a rate related to the rate of rotation of the worktable of the machine. Moreover a further series of transformer windings 66a, 66b . . . , which are mutually coupled together, are connected as shown in the conductors of the series 63a, 63b . . . , these windings having numbers of turns which are related in accordance with a quadratic law. One interpolator has three input points as shown connected to brushes 67, 68 and 69 forming part of the switch 60. The other interpolator has three input points connected to brushes 70, 71 and 72 of the switch 60. The brushes 67 to 72 of the switch 60 traverse contacts 73, 74, 75 and 76 which are connected to the output terminals of the stores P1 to P4 and in operation of the switch 60 the brushes traverse the contacts cyclically in the direction indicated by the arrow 77 so as to apply the voltage analogues set up in the storage units in cyclic order to the two interpolators. The contacts 73 to 76 are shown arranged in a plane surface on the drawing but in practice the switch 60 will be in the form of a drum switch so that the cyclic operation can readily be achieved, the switch brushes being arranged to advance the distance between centres of successive contacts, say 73 and 74 in the time taken by the brush 75 to traverse one semi-circle of the interpolator studs.

Instead of deriving the output signal of the interpolators directly from the brush 65, as shown in Figure 5, the voltage set up between adjacent studs of the interpolators can, if desired, be subjected to linear sub-interpolation as described in United States patent application Serial No. 459,814.

Figure 6 illustrates a further modification of the arrangement shown in Figure 3 in which instead of arranging that the cutter 15 effects successive passes over the work-piece 1, the cutter, or the worktable, is reciprocated continuously to cause the cutter to zig-zag symmetrically about the primary locus 2 defined by the reference points, as shown by the dotted line 2b in Figure 6. The depth of cut is controlled by simultaneous interpolation in the circumferential and axial directions. Apparatus for operating in accordance with Figure 6 may be generally similar to that shown in Figure 3 but additional storage facilities would be necessary to store instructions derived by interpolation in one direction while using them to interpolate in the other direction. The change-over switches would be unnecessary and the switch corresponding to 45 would be controlled to scan the output terminals of the device 26 cyclically at a rate related to the rate of reciprocation of the cutter.

The principle of operation which is illustrated in Figure 6 of the drawing is especially applicable where the derivatives used for interpolating in the direction transverse to the locus are recorded explicitly on the record 4, instead of being set up implicitly in the corresponding interpolating means. This form of the invention is illustrated in Figure 7 in which each value of the radius recorded on the record 4 is associated with a recorder value of $$\frac{dr}{dz}$$

at the corresponding reference point. The value of $$\frac{dr}{dz}$$

is recorded on binary code in such position on the tape that it can be read in conjunction with the corresponding value of $r$ by a single tape reader denoted by the reference 80. Reference 81 in Figure 7 denotes means for deriving signals representing values of $r$ interpolated along the locus, the rectangle 81 being assumed to comprise the parts denoted by the references 10 to 13 and P1, P2, P3 and P4 in Figure 2.

The rectangle denoted by the reference 82 represents a similar group of components arranged to derive signals representing interpolated values of $$\frac{dr}{dz}$$

at those points for which $r$ is evaluated by the apparatus 81. The output from the apparatus 82 is applied to a multiplying device 83 which may be of any suitable known construction and each value of $$\frac{dr}{dz}$$

fed to the multiplying device is multiplied by a factor $\delta z$ which is periodically variable. The rectangle 84 represents any suitable form of a mechanism for reciprocating the cutter 15 in the z direction through a distance of the order of the pitch of the locus and it is arranged that the aforesaid factor $\delta z$ is an analogue of this displacement. The factor $\delta z$ may be set up, for example, as the angular displacement of the shaft represented by the dotted line 85 driven by the mechanism 84, the shaft 85 being arranged to drive the slider of an autotransformer across which is applied the output of the apparatus 82 and thereby perform the desired multiplication. The output of the multiplying device 83 is then added to the output of the apparatus 81 in a combining circuit 87 which produces signals representing to a close approximation the radius of successive close spaced points on the actual path described by the cutter, represented by the dotted line 25 in Figure 4. In this form of the invention stores such as S, T and U and the interpolator 26 are not required.

The invention is not, of course, confined to machines which operate in cylindrical co-ordinates, and for cutting workpieces which are not solids of revolution, cartesian co-ordinates may be preferable. In this way the surface of a solid body of any form may be machined over its whole area by virtue of the provision of means for interpolating in two co-ordinate directions from the same set of instructions. A high degree of accuracy can be achieved by virtue of the interpolation in two co-ordinate directions even when the reference points are widely spaced both in the direction along the locus and in the direction transverse thereto.

What we claim is:

1. Control mechanism, suitable for controlling an automatic machine in response to a record of discrete signals representing values of one co-ordinate of relatively widely spaced points on a desired locus in which there are a plurality of spaced substantially co-extensive lengths, comprising means for deriving discrete signals in succession from said record, first interpolating means responsive to said signals for generating interpolated signals representing values of said co-ordinate of closer points on said locus, and second interpolating means responsive to said discrete signals for deriving further interpolated signals representing values of said co-ordinate of points in another locus in which there are a plurality of lengths which interlace with said lengths of the first locus.

2. Mechanism according to claim 1 comprising first servo means responsive to said first interpolated signals for producing displacement in a predetermined direction, and other servo means responsive to said other interpolated signals for producing displacement in the same direction.

3. Mechanism according to claim 1 comprising servo means for producing displacement in a predetermined direction, and switch means for alternately operating said first and second interpolating means, said servo means being responsive both to said first interpolated signals and said second interpolated signals.

4. Mechanism according to claim 1, said means for deriving discrete signals from said record comprising a plurality of record readers spaced along a record track, means for applying signals derived from one of said readers to said first interpolating means, and means for applying signals derived from a group of said record readers to said second interpolating means, said second interpolating means comprising a first-direction interpolator for interpolating within signals derived from said group of record readers, a second-direction interpolator for interpolating within groups of signals derived from said first interpolator.

5. Mechanism according to claim 4, said first mentioned reader being common to said group of readers, and comprising switch means for selectively disabling the first-direction interpolator of said second interpolating means and for applying signals derived from said common reader directly to the second-direction interpolator of said second interpolating means, thereby to cause said second-direction interpolator to function selectively as the first interpolating means.

6. Control mechanism, suitable for controlling an automatic machine in response to a record of discrete signals relating to relatively widely spaced points on a desired surface, points on which are definable by three co-ordinate values, said signals at least including representations of the values of one co-ordinate of said points, comprising means for deriving signals from said record, means for storing selected groups of signals derived from said record, first interpolating means responsive to stored signals for deriving first interpolated signals representing values of said co-ordinate at relatively close points on a line joining the respective groups of relatively widely spaced points, second interpolating means responsive to stored signals for deriving interpolated signals representing values of said co-ordinate at relatively close points displaced laterally on said line, means for producing relative displacement of components of a machine tool in response to said first and further interpolated signals in one co-ordinate direction, and means for producing relative displacement of said components of the machine tool in two further co-ordinate directions and in a manner related to the displacement produced in said first co-ordinate direction.

7. Mechanism according to claim 6, said second interpolating means comprising means for deriving signals proportional to the change of said co-ordinate with respect to a small displacement laterally from said line, and means for adding said last mentioned signals to corresponding signals derived from said first interpolating means, thereby to generate said second interpolated signals.

8. Mechanism according to claim 7, said means for deriving signals proportional to the change of said co-ordinate comprising an interpolator for interpolating within groups of such signals derived from said record, and means for multiplying output signals from said interpolator by a signal representing a displacement in said transverse direction.

9. Mechanism according to claim 8, said means for producing displacement in one of said further co-ordinate directions comprising means for producing an unidirectional component of displacement and a reciprocating component of displacement, said multiplying means being predetermined to multiply the output signal of said interpolator by a signal representing said reciprocating component.

10. Mechanism according to claim 1 comprising means for producing displacement in a single co-ordinate direction in response to said first and second interpolated signals, and means for producing displacement in at least one other co-ordinate direction in timed relationship to the derivation of said interpolated signals.

References Cited in the file of this patent

UNITED STATES PATENTS

| | | |
|---|---|---|
| 2,537,427 | Seid et al. | Jan. 9, 1951 |
| 2,628,539 | Neergaard | Feb. 17, 1953 |
| 2,685,054 | Brenner et al. | July 27, 1954 |
| 2,710,932 | Senn | June 14, 1955 |
| 2,736,852 | Nelson | Feb. 28, 1956 |

OTHER REFERENCES

"A Numerically Controlled Milling Machine," Servo-Mechanisms Laboratory, M.I.T. Copyright 1951.